US009413129B2

(12) United States Patent
Jonasson et al.

(10) Patent No.: US 9,413,129 B2
(45) Date of Patent: Aug. 9, 2016

(54) LOCATOR AND WIRE STOP DEVICE, HAND OPERATED CRIMPING TOOL, AND SYSTEM

(71) Applicant: Pressmaster AB, Älvdalen (SE)

(72) Inventors: Niklas Jonasson, Färnäs (SE); John Hutchfield, Sudbury (GB); Kellie Coble, Archdale, NC (US)

(73) Assignee: Pressmaster AB, Alvdalen (SE)

( * ) Notice: Subject to any disclaimer, the term of this patent is extended or adjusted under 35 U.S.C. 154(b) by 225 days.

(21) Appl. No.: 14/065,247

(22) Filed: Oct. 28, 2013

(65) Prior Publication Data

US 2014/0115890 A1 May 1, 2014

Related U.S. Application Data

(60) Provisional application No. 61/721,347, filed on Nov. 1, 2012.

(30) Foreign Application Priority Data

Dec. 19, 2012 (SE) ...................................... 1251464

(51) Int. Cl.
*B23P 19/00* (2006.01)
*H01R 43/042* (2006.01)
(Continued)

(52) U.S. Cl.
CPC ............ *H01R 43/042* (2013.01); *H01R 43/048* (2013.01); *H01R 4/185* (2013.01); *H01R 13/04* (2013.01); *H01R 43/0421* (2013.01); *Y10T 29/49185* (2015.01); *Y10T 29/53226* (2015.01)

(58) Field of Classification Search
CPC ..... G01N 29/04; G01N 29/07; G01N 29/221; G01N 29/265; H01R 43/048; H01R 43/0486; H01R 43/0488; H01R 43/058; H01R 43/0207; Y10T 29/53022; Y10T 29/53196; Y10T 29/53235; Y10T 29/5327
USPC .................................................... 29/705, 753
See application file for complete search history.

(56) References Cited

U.S. PATENT DOCUMENTS 3,457,764 A 7/1969 McKee
3,487,524 A 1/1970 Filia (Continued)

FOREIGN PATENT DOCUMENTS

DE 27 18 165 A1 10/1978
DE 101 34 004 C1 2/2003

(Continued)

OTHER PUBLICATIONS

HT208 Hand Crimp Tool for Mini-PV, AWG 22-26, User's Guide, Föhrenbach Application Tooling, Instruction Manual, pp. 1-6, Mar. 31, 2004, www.foehrenbach.be.

*Primary Examiner* — Paul D Kim
(74) *Attorney, Agent, or Firm* — Blank Rome LLP

(57) ABSTRACT

A locator and wire stop device mounted on a hand operated crimping tool for locating and retaining at least one crimpable connector part between two crimping dies of the hand operated crimping tool. The locator and wire stop device includes a positioning mechanism for cooperation with a connector comprising the crimpable connector part, an axially protruding connection part, and an intermediate connector body comprising a transversal protrusion. The positioning mechanism comprises a pivotable connector and wire stop element, a first resilient locator element and a second locator element. The first resilient locator element retains the connection part of the connector. During a crimping operation, the first resilient locator element abuts against an axial end of the transversal protrusion and the pivotable connector and wire stop element axially blocks the other axial end of the transversal protrusion, thereby positioning and retaining the connector in the crimping tool.

19 Claims, 5 Drawing Sheets

(51) Int. Cl.

| | |
|---|---|
| ***H01R 43/048*** | (2006.01) |
| *H01R 4/18* | (2006.01) |
| *H01R 13/04* | (2006.01) |

(56) References Cited

U.S. PATENT DOCUMENTS

| | | | | | |
|---|---|---|---|---|---|
| 3,523,351 | A | | 8/1970 | Filia | |
| 3,710,610 | A | * | 1/1973 | McCaughey | 72/409.06 |
| 3,710,611 | A | | 1/1973 | Filia | |
| 3,931,671 | A | | 1/1976 | Dittmann | |
| 4,754,636 | A | * | 7/1988 | Kautz et al. | 72/409.14 |
| 4,974,314 | A | | 12/1990 | Nickerson et al. | |
| 5,153,984 | A | | 10/1992 | Beetz et al. | |
| 6,155,095 | A | | 12/2000 | Beetz | |
| 8,161,789 | B2 | | 4/2012 | Battenfeld et al. | |

FOREIGN PATENT DOCUMENTS

| | | | |
|---|---|---|---|
| DE | 20 2008 003 703 | U1 | 6/2008 |
| DE | 10 2007 038 626 | B3 | 10/2008 |
| EP | 0 368 825 | A2 | 5/1990 |
| EP | 0 468 335 | A2 | 1/1992 |
| EP | 0 868 978 | A1 | 10/1998 |

* cited by examiner

LOCATOR AND WIRE STOP DEVICE, HAND OPERATED CRIMPING TOOL, AND SYSTEM

This application claims the benefit of U.S. Provisional Application No. 61/721,347, filed on Nov. 1, 2012, the disclosure of which is incorporated herein by reference.

FIELD OF THE INVENTION

The present invention relates to a locator and wire stop device for a hand operated crimping tool.

BACKGROUND OF THE INVENTION AND RELATED ART

When crimping, a connector i.e. a terminal, splice, contact or a similar device is mechanically secured to at least one cable—e.g to a conductor such as a wire—by deformation so that a solid joint having reliable mechanical and electrical connection is formed. The crimping operation resulting in a crimped joint is performed using crimping dies. Crimping tools may e.g. be hand operated.

In hand operated hand held crimping tools, the crimping tool is usually arranged with two proximally on the crimping tool arranged handles which are movable in relation to each other, where when the user brings the handles towards each other using hand force, usually using one hand only which when placed around both of the handles is squeezed together, the usually distally on the crimping tool arranged crimping dies are brought together in order to crimp at least one connector and cable between them.

In order to position the connector to be crimped in the crimping tool before the beginning of the crimping operation, a locator may be arranged in the crimping tool. Further, in order to position the cable in the connector to be crimped before the beginning of the crimping operation, a wire stop may be arranged in the crimping tool.

One problem that may occur when crimping is that the crimped connector expands, i.e. “floats”, in its axial direction when crimped. This can result in that the connector becomes somewhat deformed which may result in that the connector is jammed in the crimping tool.

U.S. Pat. Nos. 3,523,351 and 3,710,611 disclose a crimping tool with a locator and a wire stop.

SUMMARY OF THE INVENTION

The primary object of the present invention is to provide an improved locator and wire stop device for a hand operated crimping tool, an improved hand operated crimping tool, an improved method for positioning and retaining a connector, and a system comprising a hand operated crimping tool comprising a locator and wire stop device.

The above mentioned object of providing an improved locator and wire stop device for a hand operated crimping tool is achieved for a locator and wire stop device for a hand operated crimping tool where positioning means on the locator and wire stop device comprise a pivotable connector and wire stop element, a first resilient locator element and a second locator element, where the first resilient locator element and the second locator element comprise respective through holes both arranged to receive the connection part of the connector, where the through holes at least in combination are arranged to radially retain the connection part of the connector, and where further during a crimping operation the first resilient locator element is arranged to abut against an axial end of a transversal protrusion of the connector body and the pivotable connector and wire stop element is arranged to axially block the other axial end of the transversal protrusion of the connector body, as stated in the characterizing portion of claim 1, the locator and wire stop device thus being able to position and retain a connector having a transversal protrusion on the connector body while allowing for expansion of the connector during crimping.

The above mentioned objects of providing an improved hand operated crimping tool, and an improved method for positioning and retaining a connector, and a system comprising a hand operated crimping tool comprising a locator and wire stop device, are achieved for a tool and a method and a system as stated in the characterizing portions of claims 15 and 17 and 18, respectively.

According to one embodiment, the locator and wire stop device comprises a spacing element arranged to create a distance between the first resilient locator element and the pivotable connector and wire stop element in order to allow for a transversal protrusion of the connector body to fit therebetween.

According to one embodiment, the through holes are at least in combination arranged to retain the connection part of the connector in the rotational direction around the axial direction of the connector.

According to one embodiment, a stop device is arranged on the pivotable connector and wire stop element in order to limit the return movement thereof.

According to one embodiment, the pivotable connector and wire stop element comprises a wire stop protrusion arranged to reach into the connector body during insertion of a cable into the connector thus creating a wire stop.

According to one embodiment, the first resilient locator element is arranged to be of a material that can be compressed and is arranged abut the second locator element.

According to one embodiment, the first resilient locator element and the second locator element (8) are arranged distanced apart from each other at the respective through holes.

According to one embodiment, the locator and wire stop device is to be mounted on the crimping tool using at least one threaded connection and/or at least one pin connection.

According to one embodiment, the connector comprises at least one crimpable connector part, an axially protruding connection part, and an intermediate connector body comprising a transversal protrusion.

According to one embodiment, the hand operated crimping tool comprises a tool head, a body and two handles which handles are movably arranged in relation to each other, and where crimping dies between which at least one connector is to be crimped to a cable form a die pair, and the relative movement of the tool handles is connected to the relative movement of crimping dies forming a die pair.

These and other advantageous features will be apparent from the detailed description below.

The invention will now be described in more detail below with reference to the appended drawings which illustrate preferred embodiments of the device according to the invention.

DESCRIPTION OF PREFERRED EMBODIMENTS

Figure 1:
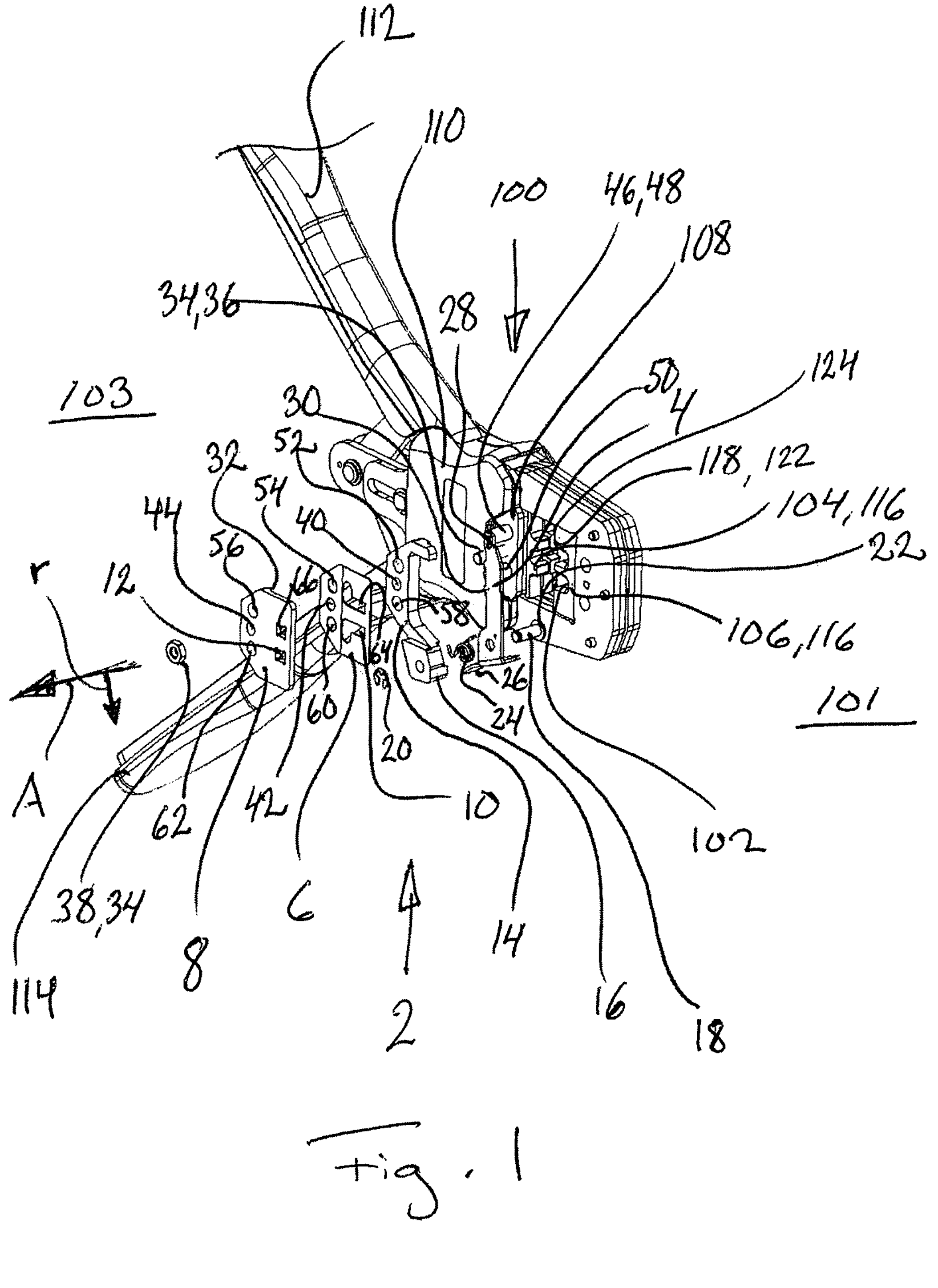
FIG. 1 shows schematically an exploded view of a locator and wire stop device according to a first embodiment of the invention.

The same reference numerals are being used for similar features in the different drawings.

FIG. 1 shows schematically an exploded view of a locator and wire stop device 2 arranged to be mounted on a hand operated crimping tool 100 outside of and adjacent to a crimp opening 102 defined by crimping dies 104, 106 on the hand operated crimping tool 100 and arranged to locate and retain at least one crimpable connector part 3, 5, 7, 9 (for references to the connector, see FIG. 2) between at least two crimping dies 104, 106 of the hand operated crimping tool 100, where the locator and wire stop device 2 comprises positioning means 4, 6, 8 for cooperation with a connector 1 comprising said at least one crimpable connector part 3, 5, 7, 9, an axially protruding connection part 11, and an intermediate connector body 13 comprising a transversal protrusion 15. The positioning means 4, 6, 8 comprise a pivotable connector and wire stop element 4, a first resilient locator element 6 and a second locator element 8, where the first resilient locator element 6 and the second locator element 8 comprise respective through holes 10, 12 both arranged to receive the connection part 11 of the connector 1, where the through holes 10, 12 at least in combination are arranged to radially r, i.e. in directions perpendicular to the axial direction A of the connector 1, retain the connection part 11 of the connector 1, and where further during a crimping operation the first resilient locator element 6 is arranged to abut against an axial end 17 of the transversal protrusion 15 of the connector body 13 and the pivotable connector and wire stop element 4 is arranged to axially block the other axial end 19 of the transversal protrusion 15 of the connector body 13 thereby positioning and retaining the connector 1 in the crimping tool 100. The first resilient locator element 6 allows for axial A expansion of the connector 1 during a crimping operation by that the first resilient locator element 6 is resilient and is thus arranged to be moved away by the possible axially A expanding connector 1 in the axial direction A of the connector 1 in order to avoid further deformation of the connector 1 other than that resulting directly from the crimping dies 104, 106 of the crimping tool 100 and thus preventing jamming of the connection part 11 of the connector 1 in the first and/or second locator elements.

Preferably, the through holes 10, 12 are at least in combination arranged to further retain the connection part 11 of the connector 1 in the rotational direction around the axial A direction of the connector 1.

The respective through holes 10, 12 are arranged aligned with each other in order for the connector 1 to be able to be inserted in both through holes 10, 12.

As can be seen in the figure, the locator and wire stop device 2 preferably comprises a spacing element 14 arranged to create a distance D between the first resilient locator element 6 and the pivotable connector and wire stop element 4 in order to allow for the transversal protrusion 15 of the connector body 13 to fit therebetween. Preferably, the spacing element is arranged to be mounted on the crimping tool 100, e.g. on the tool head 108 of the crimping tool 100, and the pivotable connector and wire stop element 4 is arranged to be mounted on the spacing element 14, e.g. on a protrusion 16 using a pivot pin 18 which is kept in position by e.g. washers 20, 22. The pivotable connector and wire stop element 4 is preferably prestressed using e.g a return spring 24 by which the pivotable connector and wire stop element 4 is forced towards its position engaging the connector 1 unless pivoted therefrom by the operator operating a control device 26 arranged thereon. A stop device 28 is preferably arranged on the connector and wire stop element 4 in order to limit the return movement thereof. The stop device 28 is preferably arranged to engage the distal edge of the first resilient locator element 6 at the end of its return movement. The stop device 28 is preferably arranged as an axial A lip on the distal edge of the connector and wire stop element 4. The connector and wire stop element 4 further preferably comprises a wire stop protrusion 30 arranged to reach into the connector body 13 during insertion of a cable 21 (see FIG. 5) into the connector 1 thus creating a wire stop.

In order to allow for axial A expansion of the connector 1 during a crimping operation, the first resilient locator element 6 may be arranged to be of a material that can be compressed and to be arranged abut the second locator element 8, or the first resilient locator element 6 and the second locator element 8 may be arranged distanced apart from each other at the respective through holes 10, 12 (as seen in the figure), i.e. a gap is arranged between the first resilient locator element 6 and the second locator element 8 at the respective through holes 10, 12. Such a gap may be accomplished by arranging the first 6 and/or second 8 locator element with a protrusion 32 at a position distanced from the respective through holes 10, 12 (as seen in the figure).

The locator and wire stop device 2 may be mounted on the crimping tool 100 using e.g. a threaded connection 34 such as e.g. at least one screw 36 and at least one nut 38 where the screw 36 is e.g. arranged connected to the crimping tool 100 and further arranged to pass through at least one hole 40, 42, 44 arranged in the wire stop device 2 and where the nut 38 is arranged to lock the locator and wire stop device 2 to the crimping tool 100. It is also, together with or without a threaded connection, possible to arrange at least one pin connection 46 such as e.g. at least one pin 48; 50 arranged e.g. connected to the crimping tool 100, where the pin 48; 50 is arranged to pass through at least one hole 52, 54, 56; 58, 60, 62 arranged in the locator and wire stop device 2 in order to position the locator and wire stop device 2 on the crimping tool 100. It is thus possible to combine a threaded connection and a pin connection as shown in the figure. The locator and wire stop device 2 is preferably to be mounted on the crimping tool 100 using at least one threaded connection 34 and also at least one pin connection 46. Two connection points are preferred to prevent the locator and wire stop device 2 from pivoting on the hand operated crimping tool 100, but blocking of such pivoting may also be arranged by using only one connection point e.g. a threaded connection 34 together with other means such as flanges preventing pivoting movement.

The hand operated crimping tool 100 may be of any kind, e.g. of the kind shown in the figure which comprises a tool head 108, a body 110 and two handles 112, 114 which handles 112, 114 are movably arranged in relation to each other, and where the body 110 is arranged between the distal end 101 and the proximal end 103 of the crimping tool 100, the tool head 108 is arranged distally 101 on the crimping tool 100, and the two handles 112, 114 are arranged proximally 103 on the crimping tool 100, and where crimping dies 104, 106 between which at least one connector 1 (see FIG. 5) is to be crimped to a cable 21 (see FIG. 5) when said crimping dies 104, 106 move towards each other form a die pair 116, and where both handles 112, 114 are pivotally arranged to the body 110, and the relative movement of the tool handles 112, 114 is connected to the relative movement of crimping dies 104, 106 forming a die pair 116.

The invention has been discussed only in connection with two crimping dies 104, 106 arranged to crimp crimpable parts 3, 5, of a connector 1, but as can be seen in the figure, further crimping dies 118, 120 forming a further die pair 122 for the same connector 1 can be arranged if crimpable parts 3, 5; 7, 9 at another position on the connector 1 are also to be crimped.

Also, further through holes 64, 66 can be arranged in the first resilient locator element 6 and the second locator element 8, e.g. if the crimping tool 100 is arranged with several crimp openings 102, 124 for connectors of more than one dimension.

Figure 2:
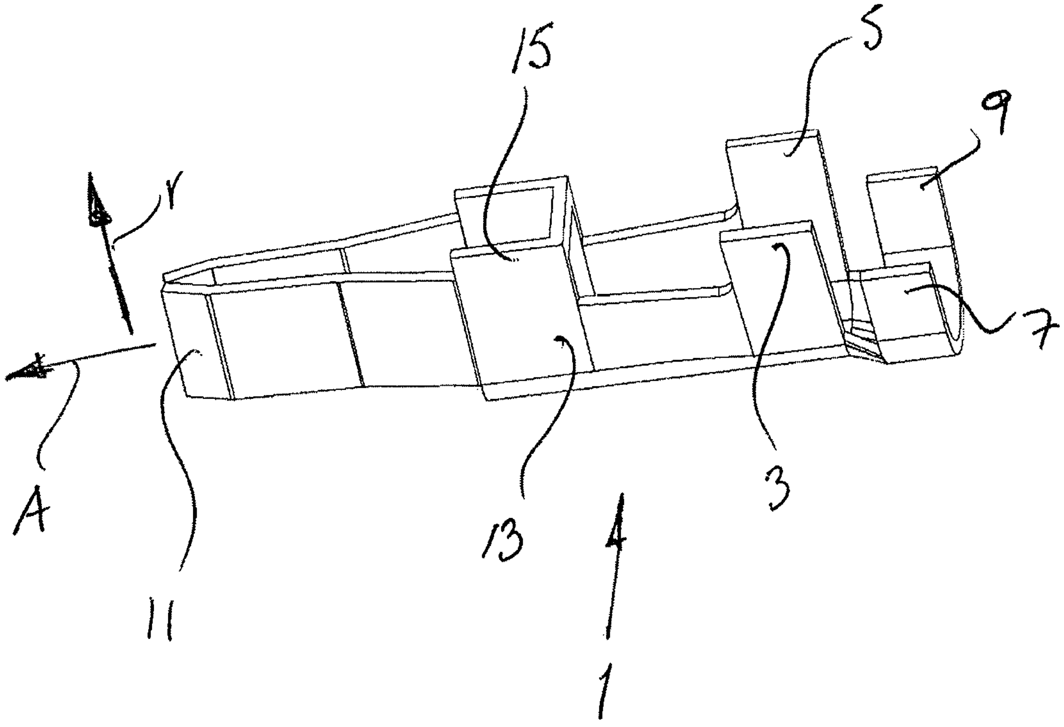
FIG. 2 shows schematically a side view an example of a connector of the type used in connection with the inventive locator and wire stop device.

FIG. 2 shows schematically a side view of an example of a connector 1 of the type used in connection with the inventive locator and wire stop device. The connector 1, which is e.g. of the type called "Minifit Senior (rollcrimp)", comprises at least one crimpable connector part 3, 5, 7, 9, an axially protruding connection part 11, and an intermediate connector body 13 comprising a transversal protrusion 15 extending in a radial direction r from the connector body 13. In the figure is also shown the axial A direction of the connector.

Figure 3:
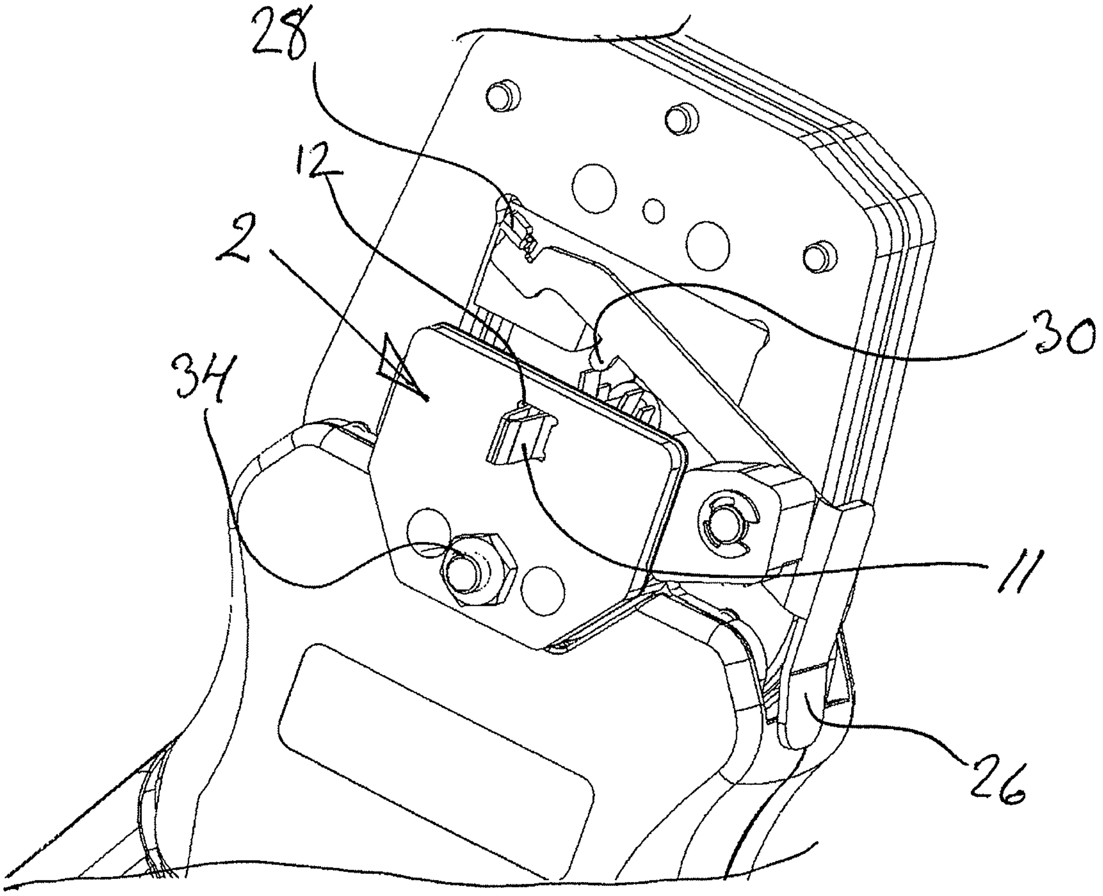
FIG. 3 shows schematically a view of a locator and wire stop device according to the first embodiment of the invention, shown in a connector insertion position.

FIG. 3 shows schematically a view of a locator and wire stop device 2 according to a second embodiment of the invention, shown in a connector insertion position together with an inserted connector 1. The embodiment of this figure differs from the embodiment in FIG. 1 in that only one set of through holes 10, 12 is arranged in this embodiment compared to two sets in the embodiment of FIG. 1. The reference numerals used are the same as used for corresponding features in FIG. 1.

Figure 4:
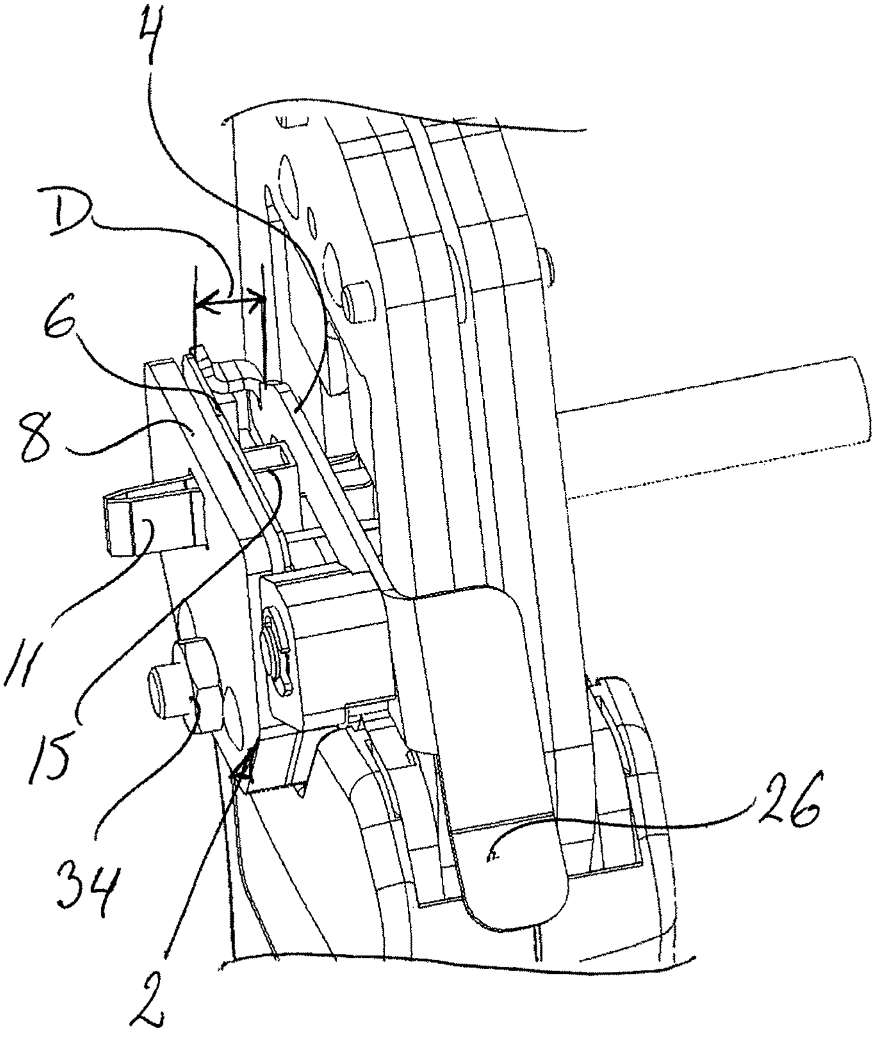
FIG. 4 shows schematically a view of a locator and wire stop device according to the first embodiment of the invention, shown in a crimping position.

FIG. 4 shows schematically a view of a locator and wire stop device 2 according to the second embodiment of the invention, shown in a crimping position together with an inserted connector 1. The reference numerals used are the same as used for corresponding features in FIG. 3.

Figure 5:
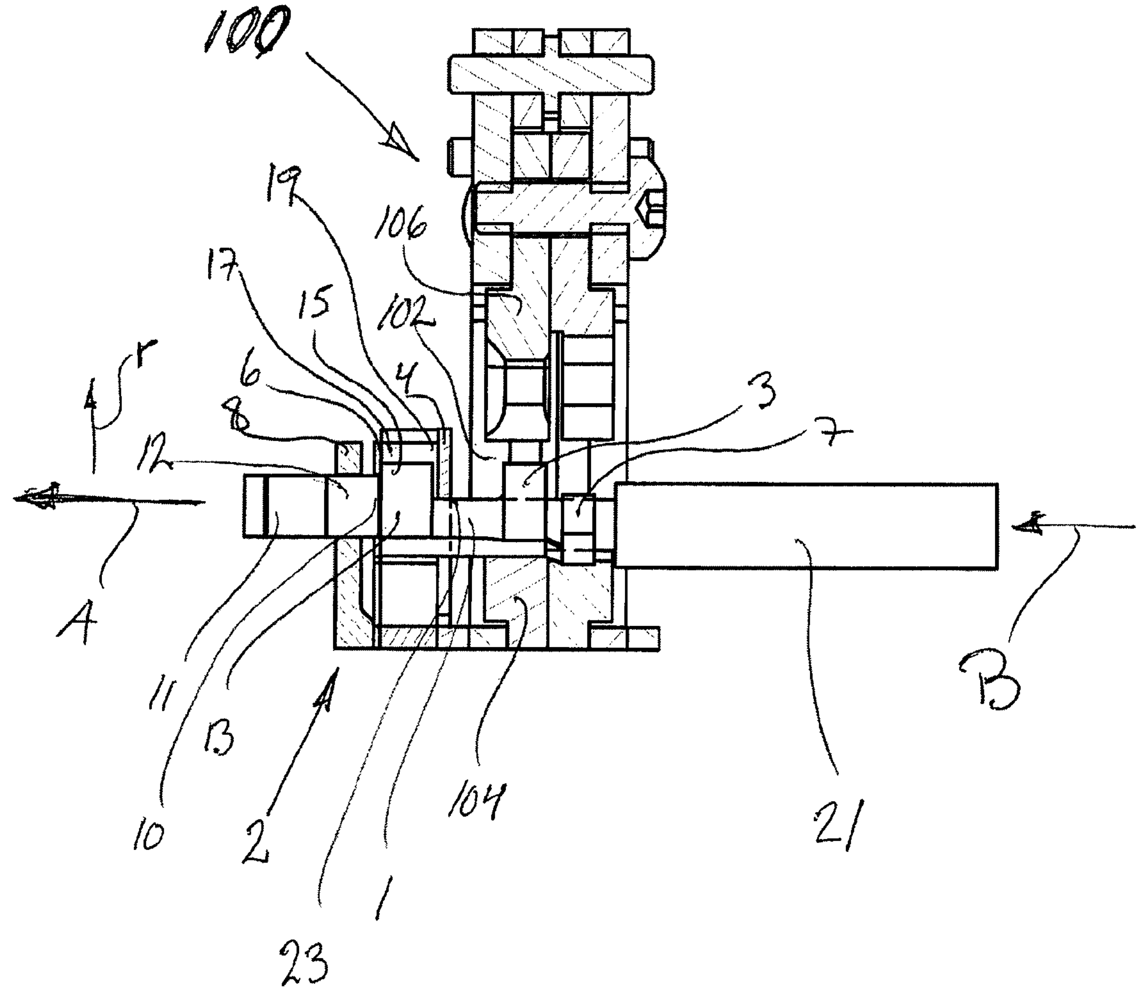
FIG. 5 shows schematically a cross-section of a locator and wire stop device according to the second embodiment of the invention, shown in an intermediate crimping position.

FIG. 5 shows schematically a cross-section of a locator and wire stop device 2 according to the second embodiment of the invention, shown in an intermediate crimping position, i.e. in a position where the crimping dies 104, 106 have almost reached the connector 1 but not yet crimped it.

Now, the operation of the locator and wire stop device 2 will be described in connection with FIG. 5.

A connector 1 comprising at least one crimpable connector part 3, 5, 7, 9, an axially protruding connection part 11, and an intermediate connector body 13 comprising a transversal protrusion 15 is positioned and retained according to the following steps using a locator and wire stop device 2 mounted on a hand operated crimping tool 100 outside of and adjacent to a crimp opening 102 defined by crimping dies 104, 106 on the hand operated crimping tool 100, the locator and wire stop device 2 comprising positioning means 4, 6, 8 comprising a pivotable connector and wire stop element 4, a first resilient locator element 6 and a second locator element 8), where the first resilient locator element 6 and the second locator element 8 comprise respective through holes 10, 12.

The steps for positioning and retaining the connector 1 are as follows:

pivoting the pivotable connector and wire stop element 4 to a position away from the path of insertion B for the connector 1 into the locator and wire stop device 2, inserting the connection part 11 of the connector 1 into the through hole 10 of the first resilient locator element 6, further inserting the connection part 11 of the connector 1 into the through hole 12 of the second locator element 8, inserting the connector 1 still further into the respective through holes 10,12 until an axial end 17 of the transversal protrusion 15 of the connector 1 abuts against the first resilient locator element 6, the through holes 10, 12 at least in combination radially r thus retaining the connection part 11 of the connector 1, and pivoting the pivotable connector and wire stop element 4 to a position in the path of insertion B for the connector 1 into the locator and wire stop device 2 whereby the pivotable connector and wire stop element 4 is arranged to axially block the other axial end 19 of the transversal protrusion 15 of the connector body 13 thus axially A retaining the transversal protrusion 15 of the connector body 13 and thus the connector 1 between the first resilient locator element 6 and the pivotable connector and wire stop element 4 thus positioning and retaining at least one crimpable connector part 3, 5, 7, 9 between at least two crimping dies 104, 106 of the hand operated crimping tool 100.

After the above positioning and retaining of the connector 1, the following steps are taken in order to crimp the connector 1 with a cable 21:

inserting a cable 21 in the connector 1 until the cable end 23 abuts the pivotable connector and wire stop element 4, crimping together the connector 1 and cable 21 by bringing together the tool handles (not shown) of the crimping tool 1, pivoting away the pivotable connector and wire stop element 4 from its return position, and removing the crimped connector 1 and cable 21 from the locator and wire stop device 2.

The invention also relates to a system comprising a hand operated crimping tool 100 comprising a locator and wire stop device 2, the system also comprising a connector 1, where the locator and wire stop device 2 is of the type discussed above, and where the connector 1 is of the type discussed above, and where the hand operated crimping tool 100 may be of any type, e.g. the type discussed above.

The invention has been shown arranged in a crimping tool having a closed head, but it is possible in other embodiments to arrange the invention in a crimping tool having an open head, or a head that may be adjusted between an open head position and a closed head position.

The connector and wire stop element 4 is preferably substantially rigid as seen in the axial direction A of the connector 1 during crimping, as the cable 21 will not normally expand significantly in the axial direction A of the connector 1 during crimping. However, it is possible to optionally arrange the connector and wire stop element 4 to be somewhat resilient as seen in the axial direction A of the connector 1 during crimping, this in order to allow for any possible axial A expansion of the cable 21 during crimping.

The features of the embodiments discussed above may be combined in further ways than those explicitly described in the embodiments above.

What is claimed is:

1. Locator and wire stop device arranged to be mounted on a hand operated crimping tool outside of and adjacent to a crimp opening defined by crimping dies on the hand operated crimping tool and arranged to locate and retain at least one crimpable connector part between at least two crimping dies of the hand operated crimping tool, where the locator and wire stop device comprises positioning means for cooperation with a connector comprising said at least one crimpable connector part, an axially protruding connection part, and an intermediate connector body comprising a transversal protrusion, wherein the positioning means comprise a pivotable connector and wire stop element, a first resilient locator element and a second locator element, wherein the first resilient locator element and the second locator element comprise respective through holes both arranged to receive the connection part of the connector, wherein the through holes at least in combination are arranged to radially retain the connection part of the connector, and wherein, during a crimping operation, the first resilient locator element is arranged to abut against an axial end of the transversal protrusion of the connector body and the pivotable connector and wire stop element is arranged to axially block the other axial end of the transversal protrusion of the connector body, thereby positioning and retaining the connector in the crimping tool, wherein the first resilient locator element and the pivotable connector and wire stop element further allow for axial expansion of the connector during the crimping operation.

2. Locator and wire stop device according to claim 1, further comprising a spacing element arranged to create a distance between the first resilient locator element and the pivotable connector and wire stop element in order to allow for the transversal protrusion of the connector body to fit therebetween.

3. Locator and wire stop device according claim 2, wherein the spacing element is arranged to be mounted on the crimping tool and the pivotable connector and wire stop element is arranged to be mounted on the spacing element.

4. Locator and wire stop device according to claim 1, wherein the through holes are at least in combination arranged to further retain the connection part of the connector in the rotational direction around an axial direction of the connector.

5. Locator and wire stop device according to claim 1, further comprising a stop device arranged on the pivotable connector and wire stop element in order to limit the return movement thereof.

6. Locator and wire stop device according to claim 5, wherein the stop device is arranged to engage the first resilient locator element at the end of its return movement.

7. Locator and wire stop device according to claim 1, wherein the pivotable connector and wire stop element further comprises a wire stop protrusion arranged to reach into the connector body during insertion of a cable into the connector, thus creating a wire stop.

8. Locator and wire stop device according to claim 1, wherein the pivotable connector and wire stop element is prestressed by a return spring by which the pivotable connector and wire stop element is forced towards its position engaging the connector unless pivoted therefrom by an operator.

9. Locator and wire stop device according to claim 1, wherein the first resilient locator element is arranged to be of a material that can be compressed and is arranged abut the second locator element.

10. Locator and wire stop device according to claim 1, wherein the first resilient locator element and the second locator element are arranged distanced apart from each other at the respective through holes.

11. Locator and wire stop device according to claim 10, wherein the first resilient and/or second locator element is arranged with a protrusion at a position distanced from the respective through holes in order to distance the first resilient locator element and the second locator element apart from each other at the respective through holes.

12. Locator and wire stop device according to claim 1, wherein the locator and wire stop device is to be mounted on the crimping tool using at least one threaded connection and at least one pin connection.

13. Locator and wire stop device according to claim 12, wherein the at least one threaded connection comprises at least one screw and at least one nut, wherein the screw is arranged connected to the crimping tool and further arranged to pass through at least one hole arranged in the wire stop device and where the at least one nut is arranged to lock the locator and wire stop device to the crimping tool.

14. Locator and wire stop device according to claim 12, wherein the at least one pin connection comprises at least one pin arranged connected to the crimping tool, wherein the at least one pin is arranged to pass through at least one hole arranged in the locator and wire stop device in order to position the locator and wire stop device on the crimping tool.

15. Hand operated crimping tool, further comprising a locator and wire stop device according to claim 1.

16. The hand operated crimping tool according to claim 15, further comprising a tool head, a body and two handles, wherein the handles are movably arranged in relation to each other, and where the body is arranged between a distal end and a proximal end of the crimping tool, the tool head is arranged distally on the crimping tool, and the two handles are arranged proximally on the crimping tool, and wherein crimping dies, between which at least one connector is to be crimped to a cable, form a die pair, and wherein both handles are pivotally arranged to the body, and the relative movement of the tool handles is connected to the relative movement of crimping dies forming the die pair.

17. System comprising a hand operated crimping tool comprising a locator and wire stop device according to claim 1, further comprising a connector.

18. System according to claim 17, wherein the connector comprises at least one crimpable connector part, an axially protruding connection part, and an intermediate connector body comprising a transversal protrusion.

19. System according to claim 17, wherein the hand operated crimping tool comprises a tool head, a body and two handles, wherein the handles are movably arranged in relation to each other, wherein the body is arranged between a distal end and a proximal end of the crimping tool, the tool head is arranged distally on the crimping tool, and the two handles are arranged proximally on the crimping tool, wherein crimping dies between which at least one connector is to be crimped to a cable form a die pair, and wherein both handles are pivotally arranged to the body, and the relative movement of the tool handles is connected to the relative movement of crimping dies forming the die pair.

* * * * *